United States Patent
Ribarov et al.

(10) Patent No.: US 11,557,988 B2
(45) Date of Patent: Jan. 17, 2023

(54) HYBRID REGENERATION BRAKE SYSTEM

(71) Applicant: GOODRICH CORPORATION, Charlotte, NC (US)

(72) Inventors: Lubomir A. Ribarov, West Hartford, CT (US); Leo J. Veilleux, Jr., Wethersfield, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 445 days.

(21) Appl. No.: 16/774,260

(22) Filed: Jan. 28, 2020

(65) Prior Publication Data
US 2021/0234482 A1 Jul. 29, 2021

(51) Int. Cl.
| | | |
|---|---|---|
| *H02P 3/14* | (2006.01) |
| *B60L 7/18* | (2006.01) |
| *B60L 7/24* | (2006.01) |
| *B64C 25/00* | (2006.01) |
| *B64C 25/44* | (2006.01) |
| *F16D 55/36* | (2006.01) |

(52) U.S. Cl.
CPC ............ *H02P 3/14* (2013.01); *B60L 7/18* (2013.01); *B60L 7/24* (2013.01); *B64C 25/001* (2013.01); *B64C 25/44* (2013.01); *F16D 55/36* (2013.01)

(58) Field of Classification Search
CPC ..... H02P 3/14; B60L 7/18; B60L 7/24; B64C 25/001; B64C 25/44; F16D 55/36
See application file for complete search history.

(56) References Cited

U.S. PATENT DOCUMENTS

| | | | |
|---|---|---|---|
| 7,703,717 B2 | 4/2010 | Soderberg | |
| 10,006,375 B1* | 6/2018 | Wagner | H02P 9/08 |
| 10,006,785 B1* | 6/2018 | Cahill | B60T 13/662 |
| 10,040,576 B1* | 8/2018 | Rosenberg | B64D 45/08 |
| 10,486,690 B2* | 11/2019 | Colavincenzo | B60K 6/48 |
| 2002/0047418 A1* | 4/2002 | Seguchi | F02N 11/04 310/114 |
| 2005/0224642 A1* | 10/2005 | Sullivan | B64C 25/50 244/111 |
| 2007/0205683 A1* | 9/2007 | Kawamura | H02K 21/029 310/266 |
| 2007/0205684 A1* | 9/2007 | Iwata | H02K 21/029 310/266 |

(Continued)

FOREIGN PATENT DOCUMENTS

| | | |
|---|---|---|
| EP | 2070818 | 6/2009 |
| GB | 2220178 | 1/1990 |
| WO | 2016108878 | 7/2016 |

OTHER PUBLICATIONS

European Patent Office, European Search Report dated Jun. 16, 2021 in Application No. 21153733.7.

*Primary Examiner* — Peter D Nolan
*Assistant Examiner* — Wae L Louie
(74) *Attorney, Agent, or Firm* — Snell & Wilmer L.L.P.

(57) ABSTRACT

A multi-disk brake system comprises an electrical generator disposed therein. The electrical generator is configured to convert mechanical energy to electrical energy. The mechanical energy may be generated during a braking event of the multi-disk brake system. The electric generator may power various electrical components on the aircraft or store the electrical energy in a capacitor bank. The electric generator may also act as a motor and/or power a landing gear in a motor configuration.

16 Claims, 6 Drawing Sheets

(56) References Cited

U.S. PATENT DOCUMENTS

| | | | |
|---|---|---|---|
| 2008/0258014 A1 | 10/2008 | McCoskey et al. | |
| 2009/0001914 A1* | 1/2009 | Atarashi | B60K 6/48 |
| | | | 903/906 |
| 2009/0152394 A1 | 6/2009 | Frank et al. | |
| 2009/0251021 A1* | 10/2009 | Atarashi | H02P 6/16 |
| | | | 310/156.07 |
| 2011/0285237 A1* | 11/2011 | Amari | H02K 15/03 |
| | | | 29/598 |
| 2013/0181562 A1* | 7/2013 | Gieras | H02K 16/02 |
| | | | 310/114 |
| 2013/0327884 A1 | 12/2013 | Yiu | |
| 2014/0263832 A1 | 9/2014 | Messier-Bugatti-Dowty | |
| 2016/0176515 A1 | 6/2016 | Sullivan | |
| 2018/0162369 A1* | 6/2018 | Colavincenzo | F02N 11/003 |
| 2018/0162375 A1* | 6/2018 | Colavincenzo | B60L 50/30 |
| 2019/0047685 A1 | 2/2019 | Sullivan | |
| 2019/0271317 A1* | 9/2019 | Juan | F04C 25/00 |
| 2020/0080609 A1* | 3/2020 | Muniraju | G01D 5/40 |
| 2021/0234482 A1* | 7/2021 | Ribarov | H02P 3/14 |

* cited by examiner

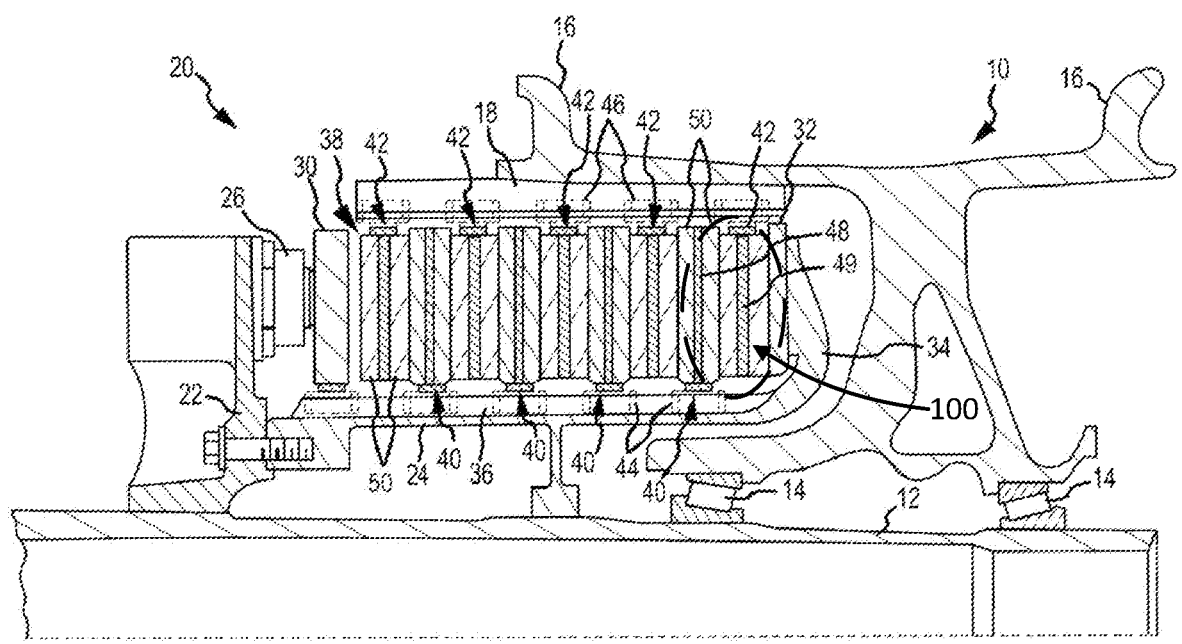
FIG. 1
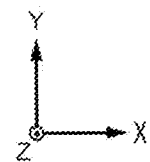

SECT B-B

SECT C-C

HYBRID REGENERATION BRAKE SYSTEM

FIELD

The present disclosure relates to hybrid regeneration braking systems, and more specifically to hybrid regeneration braking systems of aircraft braking systems.

BACKGROUND

Aircraft multi-disk brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. The friction disks may experience wear during braking events. Kinetic energy generated during braking events is typically lost to heat.

SUMMARY

A multi-disk brake system is disclosed herein. The multi-disk brake system may comprise: a pressure plate disposed at a proximal end of the multi-disk braking system; an end plate disposed at a distal end of the pressure plate, the distal end being distal to the proximal end; a plurality of rotors disposed between the pressure plate and the end plate; a plurality of stators interleaved between the plurality of rotors; and an electric generator disposed proximate the end plate, the electric generator configured to convert mechanical energy from a braking event to electrical energy in a generator configuration.

In various embodiments, the electric generator is configured to convert electrical energy to mechanical energy in a motor configuration. The electric generator may be an axial flux electric generator. The electric generator may comprise: a stator in the plurality of stators; a rotor in the plurality of rotors; a permanent magnet assembly coupled to the rotor, the permanent magnet assembly disposed between the stator and the rotor; and a coil coupled to the stator, the coil disposed between the permanent magnet assembly and the stator. The permanent magnet assembly may comprise a first plurality of permanent magnets interleaved circumferentially about the rotor between a second plurality of permanent magnets, the first plurality of permanent magnets configured to attract the second plurality of permanent magnets. The multi-disk brake system may further comprise a heat shield coupled to the stator, the heat shield disposed axially opposite the coil. The multi-disk brake system may further comprise a plurality of the coil disposed circumferentially about the stator. The electric generator may be in the generator configuration when the plurality of rotors rotates in a first direction, wherein the plurality of rotors rotates in a second direction when the electric generator is in a motor configuration, the second direction opposite the first direction.

A landing gear system is disclosed herein. The landing gear system may comprise: a multi-disk brake system including an electric generator, the electric generator configured to convert mechanical energy from a braking event of the multi-disk brake system into electrical energy in a generator configuration; a capacitor charger in electrical communication with the electric generator, the capacitor charger configured to receive the electrical energy in the generator configuration; and a capacitor bank electrically coupled to the capacitor charger, the capacitor charger configured to charge the capacitor bank in the generator configuration of the electric generator.

In various embodiments, the landing gear system may further comprise a motor controller coupled to the electric generator, the motor controller configured to command the electric generator to switch from the generator configuration to a motor configuration. The landing gear system may further comprise a battery charger and a battery, wherein the battery charger is electrically coupled to the capacitor bank, and wherein the battery is electrically coupled to the battery charger. The landing gear system may further comprise a full authority digital engine control (FADEC) operatively coupled to the motor controller, the FADEC configured to send a command signal to the motor controller to dissipate energy from the battery and switch the electric generator to the motor configuration. The electric generator may be an axial flux electric generator. The multi-disk brake system may further comprise a plurality of stators and a plurality of rotors interleaved between the plurality of stators, wherein the electric generator comprises a stator in the plurality of stators, a rotor in the plurality of rotors, a permanent magnet assembly coupled to the rotor, and a coil coupled to the stator. The permanent magnet assembly may comprise a first plurality of magnets interleaved circumferentially between a second plurality of magnets, wherein the first plurality of magnets attracts the second plurality of magnets. The permanent magnet assembly may be disposed axially between the coil and the rotor. The landing gear system may further comprise a heat shield coupled to the stator, the heat shield disposed axially opposite the coil.

A method of using an electrical generator in a multi-disk brake system is disclosed herein. The method may comprise generating, via the electrical generator, electrical energy in response to an aircraft braking, the electrical generator disposed in the multi-disk brake system; and sending, via the electrical generator, the electrical energy to at least one of an electrical component or a capacitor charger.

In various embodiments, the method may further comprise receiving electrical energy from the capacitor charger when the electrical generator is in a motor configuration. The method may further comprise using, via the electrical generator, the received electrical energy to taxi the aircraft.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 1 illustrates a cross-sectional view of a multi-disk brake system, in accordance with various embodiments;

Figure 2:
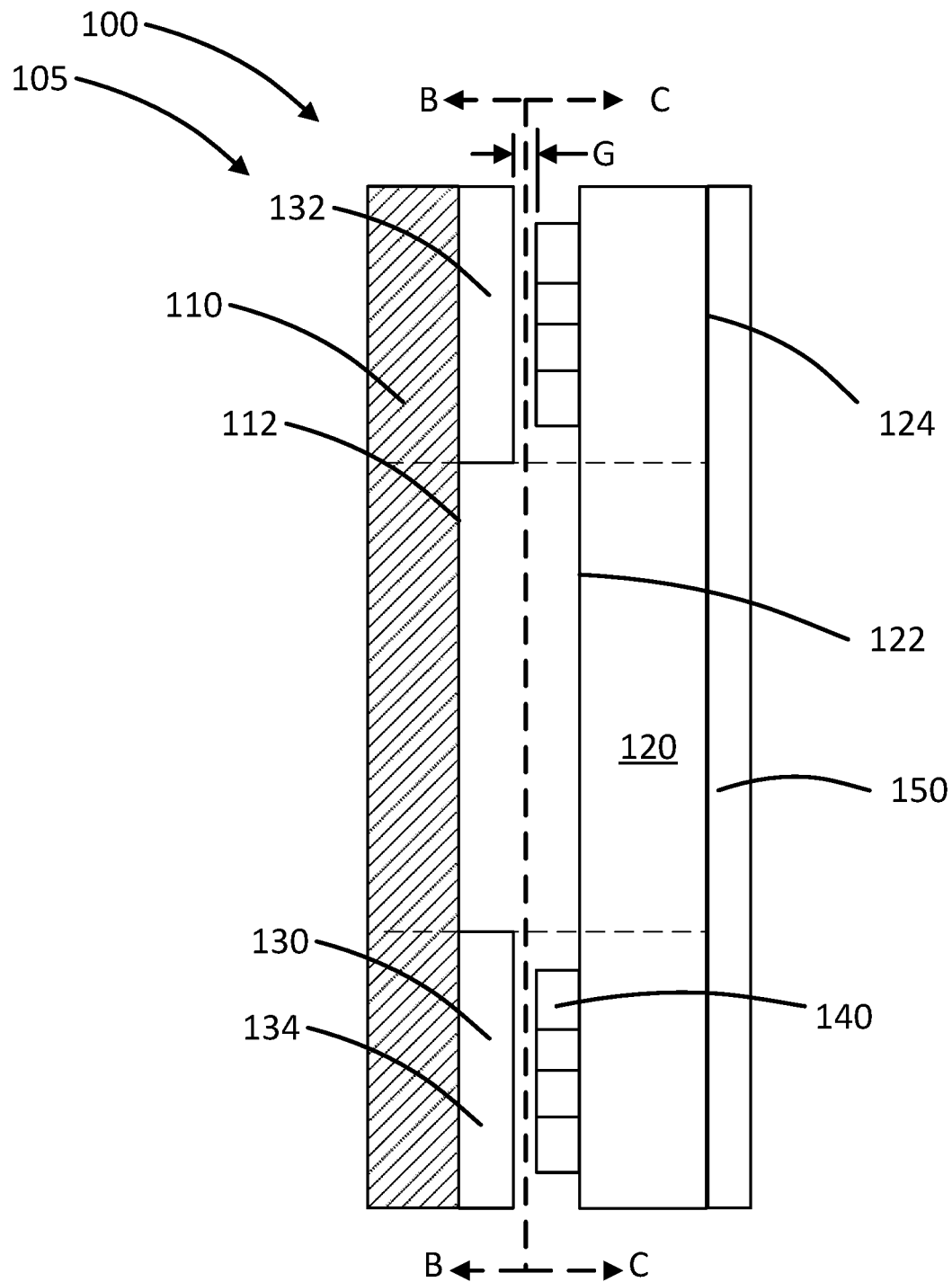
FIG. 2 illustrates a cross-sectional view an electric generator of a multi-disk brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Disclosed herein, according to various embodiments, is a multi-disk braking system. The multi-disk brake system includes a plurality of rotors interleaved between a plurality of stators, a pressure plate at a proximal end, an end plate at a distal end, and an electric generator. As described in greater detail below, the electric generator may comprise a rotor, a permanent magnet, a coil, a stator, and/or a heat shield. The electric generator may be disposed proximate the end plate of the multi-disk brake system. In various embodiments, the multi-disk brake system may comprise a plurality of the electric generators. The electric generator may comprise an axial flux permanent magnet device, such as a wound-rotor motor, a printed rotor winding motor, a three-coil motor, or the like. In various embodiments, the electric generator may be configured to act as a generator in a generator configuration and act as a motor in a motor configuration. A "generator configuration" as disclosed herein, is a configuration that converts mechanical energy to electrical energy. A "motor configuration," as disclosed herein, is a configuration that converts electrical energy to mechanical energy.

The multi-disk brake system having the electric generator(s) may be configured to harvest energy dissipated at landing of an aircraft, or the like. The multi-disk brake system may be configured to allow for short push-back/taxi out driving with electrically powered main landing gear and/or allow taxi while main engines are off. The multi-disk brake system, as disclosed herein, may provide significant fuel cost savings and/or provide additional electric energy for use on the aircraft.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons/actuators 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. Each friction disk 38 may comprise a solid disk, split disk or friction wear liners and core. The plurality of friction disks 38 includes at least one friction wear liners with a non-rotatable core, also known as a stator 40, and at least one friction disk wear liners with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon or CMC composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons/actuators 26 are connected to torque flange 22 at circumferentially spaced positions around torque flange 22. Pistons/actuators 26 face axially toward wheel 10 and contact a side of pressure plate 30 opposite friction disks 38. Pistons/actuators 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32.

In various embodiments, the multi-disk brake system 20 may comprise an electric generator 100 disposed within the interleaved rotors 42 and stators 40. The electric generator 100 may be configured to act as a generator during a braking event. For example, the electric generator 100 may convert mechanical energy generated during braking to electrical energy, which may be used later to power various electrical components, or the like.

Referring now to FIG. 2, an enlarged view of the electric generator 100, as shown in FIG. 1, is illustrated, in accordance with various embodiments. The electric generator 100 may comprise an axial flux electric generator 105. Although illustrated as an axial flux electric generator 105, any electric generator known in the art configured to convert mechanical braking energy to electrical energy could be utilized, such as a wound-rotor motor, a printed rotor winding motor, a three-coil motor, or the like. The axial flux electric generator 105 comprises a rotor 110, a stator 120, a permanent magnet assembly 130, a coil 140, and a heat shield 150. The rotor 110 comprises a rotor axial surface 112 disposed proximate a stator axial surface 122 of the stator 120. In various embodiments, rotor 110 may be any of rotors 42 and stator 120 may be any of stators 40 from FIG. 1. In various embodiments, there may be a plurality of the axial flux electric generator 105 in the multi-disk brake system 20. The permanent magnet assembly 130 may be coupled to the rotor 110 by any method known in the art, such as fasteners, adhesives, or the like. The permanent magnet assembly 130 may be disposed on the rotor axial surface 112. The permanent magnet assembly 130 may comprise a first magnet 132 and a second magnet 134. The first magnet 132 may comprise a north (N) magnet. The second magnet 134 may comprise a south (S) magnet. The axial flux electric generator 105 may comprise a plurality of the first magnet 132 and a plurality of the second magnet 134 interleaved circumferentially about the rotor axial surface 112.

The coil 140 may be coupled to the stator axial surface 122 of the stator 120. The coil 140 may be disposed proximate the permanent magnet assembly 130. The coil 140 may be separated axially from the permanent magnet assembly 130 by a gap G. The heat shield 150 may be coupled to the stator 120 on a second stator axial surface 124. The second stator axial surface 124 may be disposed opposite the stator axial surface 122. The heat shield 150 may be configured to protect the axial flux electric generator 105 from heat generated by the multi-disk brake system 20 from FIG. 1.

Figure 3:
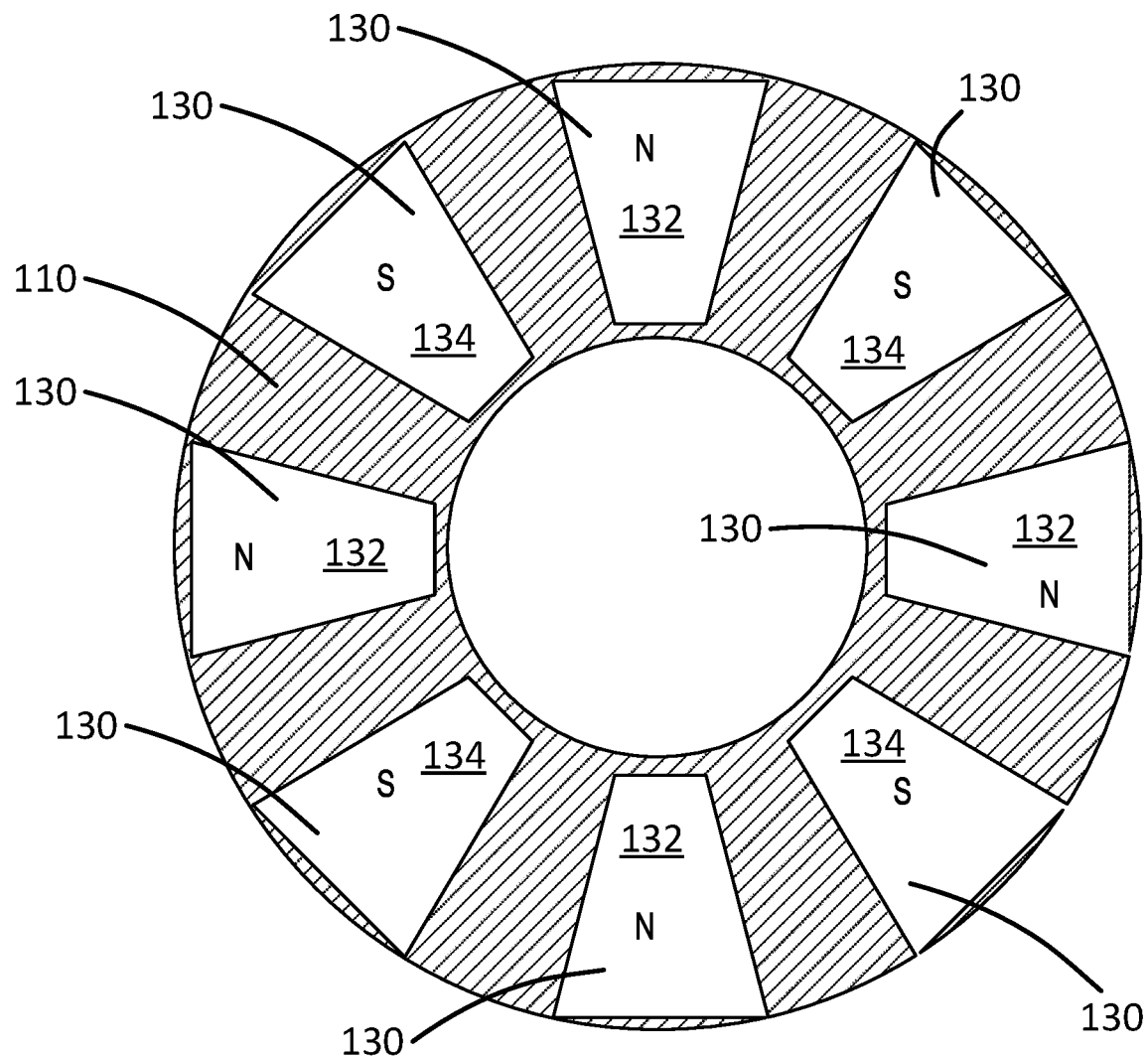
FIG. 3 illustrates a cross-sectional view along section line B-B from FIG. 2 of the electric generator of a multi-disk brake system, in accordance with various embodiments.

Referring now to FIG. 3, a cross-section view of a portion of the axial flux electric generator 105 along section line B-B from FIG. 2 is illustrated, in accordance with various embodiments. In various embodiments, the permanent magnet assembly 130 include a plurality of the first magnet 132 and a plurality of the second magnet 134. Each magnet in the plurality of the first magnet 132 is disposed circumferentially adjacent to a magnet in the plurality of the second magnet 134. In various embodiments, the first magnet 132 is configured to repel another first magnet 132 and the first magnet 132 is configured to attract the second magnet 134. For example, first magnet 132 may comprise a north (N) magnet and the second magnet 134 may comprise a south (S) magnet. The permanent magnet assembly 130 may be configured to rotate during operation of the multi-disk brake system 20 from FIG. 1. For example, the permanent magnet assembly 130 is coupled to the rotor 110, which rotates during operation of multi-disk brake system 20.

Figure 4:
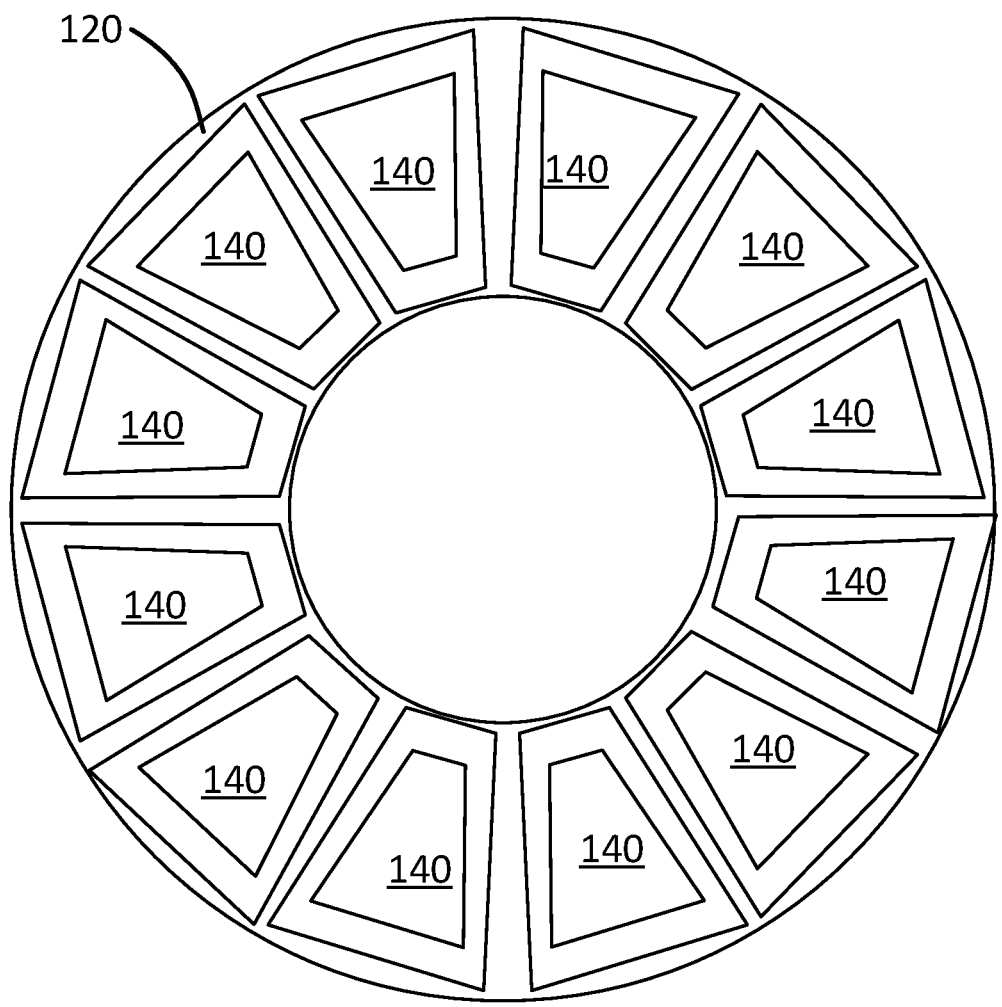
FIG. 4 illustrates a cross-sectional view along section line C-C from FIG. 2 of the electric generator of a multi-disk brake system, in accordance with various embodiments.

Referring now to FIG. 4, a cross-section view of a portion of the axial flux electric generator 105 along section line C-C from FIG. 2 is illustrated, in accordance with various embodiments. In various embodiments, the axial flux electric generator 105 includes a plurality of the coil 140. Each coil in the plurality of the coil 140 is disposed circumferentially adjacent to another coil in the plurality of the coil 140. The plurality of the coil 140 are coupled to the stator 120. The plurality of the coil 140 are configured to remain static during operation of the multi-disk brake system 20 from FIG. 1. For example, the plurality of the coil 140 are coupled to the stator 120, which remains static during operation of multi-disk brake system 20.

In various embodiments, the axial flux electric generator 105 may act as a generator and a motor. For example, when the rotor 110 is rotating in a first direction (e.g., clockwise) the axial flux electric generator 105 may act as a generator by converting mechanical energy into electrical energy. In this regard, the axial flux electric generator 105 may be configured to store electrical energy in response to high mechanical kinetic energy events, such as braking during landing of an aircraft, or the like. In various embodiments, the axial flux electric generator 105 may act as a motor when the rotor 110 is rotating in a second direction (e.g., counter-clockwise). For example, the stored energy from the axial flux electric generator 105 may be used during taxi out of an aircraft, or the like. In this regard, significant fuel savings may be realized by leaving engines of an aircraft off during taxi out, or the like.

Figure 5:
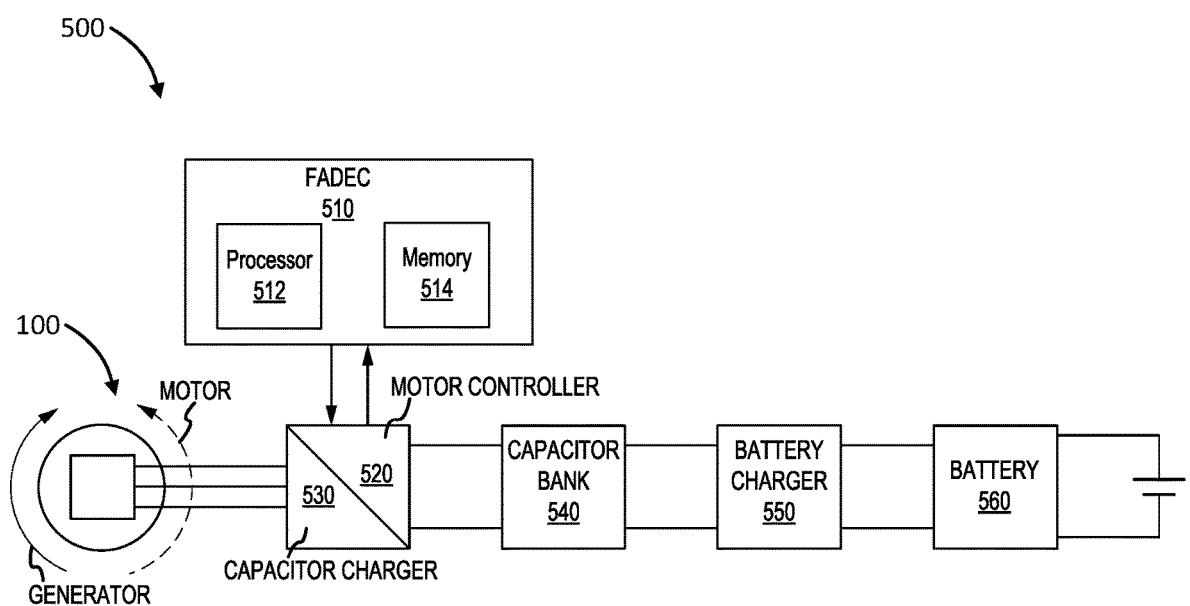
FIG. 5 illustrates a schematic view of a landing gear system, in accordance with various embodiments.

Referring now to FIG. 5, an aircraft landing gear system 500 for controlling a multi-disk brake system 20 from FIG. 1 is illustrated, in accordance with various embodiments. In various embodiments, aircraft landing gear system 500 may be integrated into computer systems onboard an aircraft (e.g., an aircraft) such as, for example, a brake control unit (BCU), a full authority digital engine control (FADEC), an engine-indicating and crew-alerting system (EICAS), and/or the like. Aircraft landing gear system 500 may also be a standalone computer system separate from the aircraft and in electronic communication with the aircraft, as described in further detail herein. Aircraft landing gear system 500 may include one or more processors and/or one or more tangible, non-transitory memories and be capable of implementing logic. As described herein, each "controller", and/or the like may also comprise an individual processor and/or one or more tangible, non-transitory memories and be capable of implementing logic. In various embodiments, each controller, and/or the like may also be implemented in a single processor (e.g., aircraft landing gear system 500 may comprise a single processor). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, aircraft landing gear system 500 may comprise a processor 512 configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, aircraft landing gear system 500 may comprise a full authority digital engine control (FADEC) 510 in operative communication with a motor controller 520 and/or a capacitor charger 530. The aircraft landing gear system 500 may further comprise an electric generator 100. The motor controller 520 and/or the capacitor charger 530 may be in operative communication with the electric generator 100. For example, during a braking event, the electric generator 100 may be configured to act as an electric generator (i.e., may convert mechanical energy from braking into electrical energy). The electric generator 100 may transfer the electrical energy to the capacitor charger 530. The electrical energy stored in the capacitor charger 530 may be utilized anywhere on an aircraft (e.g., for the axial flux electric generator 105 when the electric generator 100 is acting as a motor, for electronics within a fuselage, the electronic control system, or the like).

In various embodiments, the aircraft landing gear system 500 further comprises a capacitor bank 540, a battery charger 550, and/or a battery 560. The capacitor charger 530 may be in operative communication with the capacitor bank 540, the capacitor bank 540 may be in operative communication with the battery charger 550, and/or the battery charger 550 may be in operative communication with the battery 560. In various embodiments, electrical energy generated from the electric generator 100 may be harvested in battery in capacitor bank 540 via the capacitor charger 530 during a braking event, or the like. The capacitor bank 540 may power battery charger 550. In this regard, battery charger 550 may be configured to charge battery 560. When the electrical energy is to be utilized, a control signal may be sent from the FADEC 510, via processor 512, to the motor controller 520. The motor controller 520 may be configured to instruct battery 560 to dissipate energy. The energy dissipated from battery 560 may power the electric generator 100, and the electric generator 100 may act as a motor and/or electrically power a landing gear system of an aircraft.

In various embodiments, FADEC 510 may comprise various components to aid in controlling the electric generator 100. For example, FADEC 510 may comprise a computing device (e.g., processor 512) and an associated memory 514. Processor 512 may comprise any suitable processor, such as, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof. Memory 514 may comprise an article of manufacture including a tangible, non-transitory computer-readable storage medium having instructions stored thereon that, in response to execution by the computing device (e.g., processor 512), cause the computing device to perform various methods, as discussed further herein.

Figure 6:
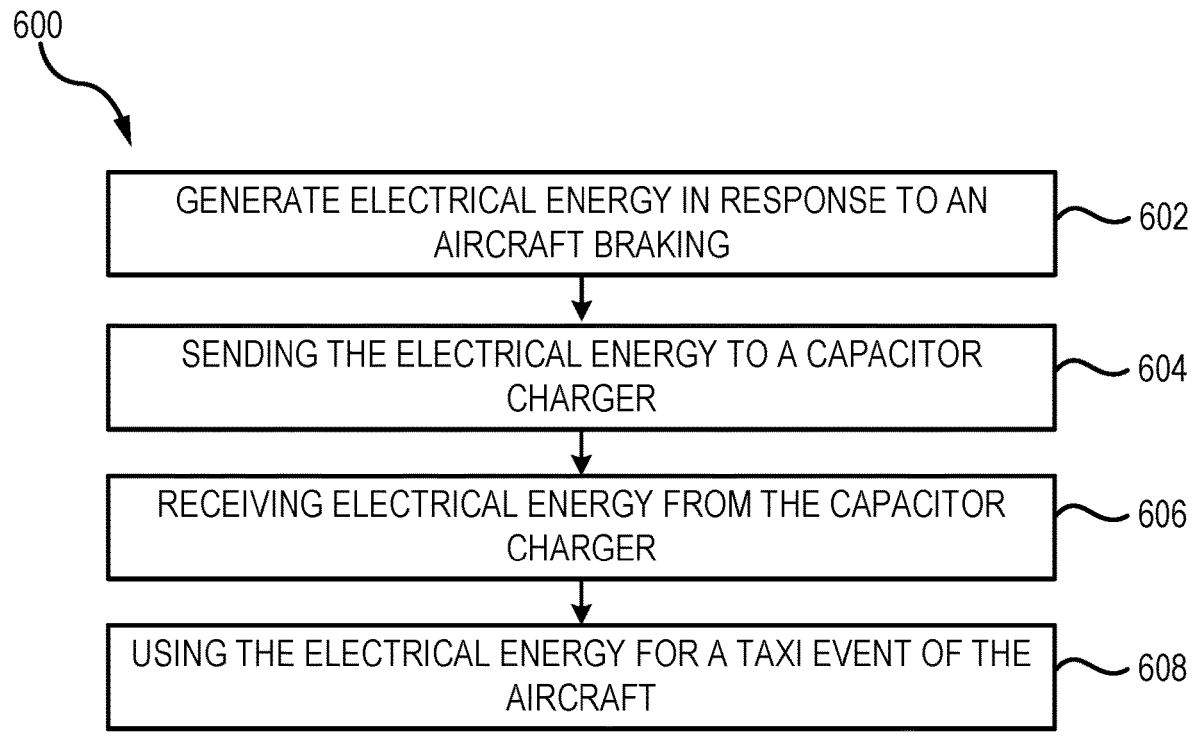
FIG. 6 illustrates a method of using an electric generator in a multi-disk brake system, in accordance with various embodiments.

Referring now to FIG. 6, a method 600 of using an electric generator in a landing gear system for an aircraft is illustrated, in accordance with various embodiments. The method 600 may comprise generating, via the electric generator, electrical energy in response to an aircraft braking (step 602). The electric generator may be any electric generator known in the art, such as a pancake motor/generator, a wound-rotor motor/generator, a printed rotor winding motor/generator, three-coil motors/generators, the axial flux electric generator 105, or the like. An electric field may be generated in response to the rotor spinning in a first direction (e.g., clockwise or counterclockwise). The electric field may convert mechanical energy from the aircraft braking event into electrical energy. The method 600 may further comprise sending, via the electric generator, electrical energy to the capacitor charger (step 604). The capacitor charger may be in communication with a capacitor bank. The capacitor bank may be configured to store the electrical energy. In various embodiments, the electrical energy may be sent directly to an electrical component of the aircraft for immediate use, or the like.

The method 600 may further comprise receiving electrical energy from the capacitor charger (step 606). The electrical energy may be received in response to a command from a controller or the like. The method may further comprise using the electrical energy for a taxi event of the aircraft (step 608). For example, during taxiing back from the gate, the axial flux electric motor/generator may be used in a motor configuration in response to receiving the command from the controller. In this regard, any energy that was previously stored may be utilized as a motor to power the taxi event. By utilizing an axial flux electric motor/generator in this manner, significant fuel savings may be achieved. The kinetic energy dissipated during breaking may be harvested by converting the kinetic energy to electric energy, storing the electric energy, and later using the electric energy to power the motor configuration of the axial flux electric motor/generator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-disk brake system, comprising:
a pressure plate disposed at a proximal end of the multi-disk brake system;
an end plate disposed at a distal end of the pressure plate, the distal end being distal to the proximal end;
a plurality of rotors disposed between the pressure plate and the end plate;
a plurality of stators interleaved between the plurality of rotors; and
an electric generator disposed proximate the end plate, the electric generator including a generator rotor, a generator stator, a permanent magnet assembly coupled to the generator rotor, a coil coupled to the generator stator, and a heat shield coupled to the generator stator, the coil separated axially from the permanent magnet assembly by a gap, the heat shield configured to protect the electric generator from heat generated by the multi-disk brake system, the electric generator configured to act as a generator and a motor.

2. The multi-disk brake system of claim 1, wherein the electric generator is configured to convert electrical energy to mechanical energy in a motor configuration.

3. The multi-disk brake system of claim 1, wherein the electric generator is an axial flux electric generator.

4. The multi-disk brake system of claim 1, wherein the permanent magnet assembly comprises a first plurality of permanent magnets interleaved circumferentially about the generator rotor between a second plurality of permanent magnets, the first plurality of permanent magnets configured to attract the second plurality of permanent magnets.

5. The multi-disk brake system of claim 1, further comprising a plurality of the coil disposed circumferentially about the generator stator.

6. The multi-disk brake system of claim 1, wherein the electric generator is in a generator configuration when the plurality of rotors rotate in a first direction, and wherein the plurality of rotors rotates in a second direction when the electric generator is in a motor configuration, the second direction opposite the first direction.

7. A landing gear system, comprising:
a multi-disk brake system including an electric generator, a plurality of stators, and a plurality of rotors, the plurality of rotors interleaved between the plurality of stators, wherein the electric generator includes a generator rotor, a generator stator, a permanent magnet assembly coupled to the generator rotor, a coil coupled to the generator stator, and a heat shield coupled to the generator stator, the coil separated axially from the permanent magnet assembly by a gap, the heat shield configured to protect the electric generator from heat generated by the multi-disk brake system, the electric generator configured to act as a generator and a motor;
an axle defining an axis of rotation the multi-disk brake system;
a capacitor charger in electrical communication with the electric generator, the capacitor charger configured to receive electrical energy in a generator configuration; and
a capacitor bank electrically coupled to the capacitor charger, the capacitor charger configured to charge the capacitor bank in the generator configuration of the electric generator.

8. The landing gear system of claim 7, further comprising a motor controller coupled to the electric generator, the motor controller configured to command the electric generator to switch from the generator configuration to a motor configuration.

9. The landing gear system of claim 8, further comprising a battery charger and a battery, wherein the battery charger is electrically coupled to the capacitor bank, and wherein the battery is electrically coupled to the battery charger.

10. The landing gear system of claim 9, further comprising a full authority digital engine control (FADEC) operatively coupled to the motor controller, the FADEC configured to send a command signal to the motor controller to dissipate energy from the battery and switch the electric generator to the motor configuration.

11. The landing gear system of claim 7, wherein the electric generator is an axial flux electric generator.

12. The landing gear system of claim 7, wherein the permanent magnet assembly comprises a first plurality of magnets interleaved circumferentially between a second plurality of magnets, and wherein the first plurality of magnets attracts the second plurality of magnets.

13. The landing gear system of claim 7, wherein the permanent magnet assembly is disposed axially between the coil and the generator rotor.

14. A method of using an electric generator in a multi-disk brake system, the method comprising:
generating, via the electric generator, electrical energy in response to an aircraft braking, the electric generator disposed in the multi-disk brake system, the electric generator comprising a generator rotor, a generator stator, a permanent magnet assembly coupled to the generator rotor, a coil coupled to the generator stator, and a heat shield coupled to the generator stator, the coil separated axially from the permanent magnet assembly by a gap, the heat shield configured to protect the electric generator from heat generated by the multi-disk brake system, the electric generator configured to act as a generator and a motor; and
sending, via the electric generator, the electrical energy to at least one of an electrical component or a capacitor charger.

15. The method of claim 14, further comprising receiving electrical energy from the capacitor charger when the electric generator is in a motor configuration.

16. The method of claim 15, further comprising using, via the electric generator, the received electrical energy to taxi the aircraft.

\* \* \* \* \*